United States Patent [19]

Jones

[11] Patent Number: 5,479,156
[45] Date of Patent: Dec. 26, 1995

[54] VEHICLE SECURITY SYSTEM RESPONSIVE TO SHORT AND LONG RANGE TRANSMITTERS

[75] Inventor: Mark W. Jones, Bellflower, Calif.

[73] Assignee: Magnadyne Corporation, Compton, Calif.

[21] Appl. No.: 359,521

[22] Filed: Dec. 20, 1994

[51] Int. Cl.$^6$ .................................................. G06F 7/04
[52] U.S. Cl. .............................. 340/825.31; 340/825.69; 340/825.72
[58] Field of Search ................... 340/825.31, 825.69, 340/825.72, 825.32, 426, 428; 307/10.2, 10.4, 10.5; 180/287

[56] References Cited

U.S. PATENT DOCUMENTS

| | | | |
|---|---|---|---|
| 4,428,024 | 1/1984 | Mochida et al. | 340/825.31 X |
| 4,804,856 | 2/1989 | Hanisko et al. | |
| 5,109,221 | 4/1992 | Lambropoulos et al. | 340/825.69 |
| 5,113,182 | 5/1992 | Suman et al. | 340/825.31 |
| 5,146,215 | 9/1992 | Drori | 340/825.32 |
| 5,264,825 | 11/1993 | Schneider | 340/426 |
| 5,285,186 | 2/1994 | Chen | 340/428 |
| 5,323,140 | 6/1994 | Boyles | 340/428 |
| 5,381,128 | 1/1995 | Kaplan | 340/426 |

OTHER PUBLICATIONS

Vehicle Protection Systems brochures, Published by Vehicle Protection Systems of Huston, Tex., copyright 1993.

*Primary Examiner*—Donald J. Yusko
*Assistant Examiner*—Edwin C. Holloway, III
*Attorney, Agent, or Firm*—Brooks & Kushman

[57] ABSTRACT

A vehicle security system that includes a receiver/controller which may be installed on all vehicles on a dealer's lot and "taught" to respond to a low power short range "dealer" transmitter prior to sale and to a conventional relatively high power long range "customer" transmitter after sale. The short range transmitter permits a salesman to demonstrate the security system as a natural adjunct to the sale of any one of all the vehicle on a dealer's lot without affecting the state of security of other vehicles in the vicinity. The controller can be taught to respond to either a dealer or a customer transmitter but all dealer transmitter ID's are deleted when teaching a customer transmitter ID and vice versa. In addition only one dealer code can be stored at any one time. A removable valet switch is operative after sale of the vehicle to permit override of the system. Prior to sale the controller is programmed to inhibit operation to the valet switch. The removable valet switch and an LED indicator are housed in a single housing for convenience of installation and ease of use.

19 Claims, 6 Drawing Sheets

"1"

"0"

|← T →|

|← 3/4T →|

|→|1/4T|

|← N BITS →|← OFF →|

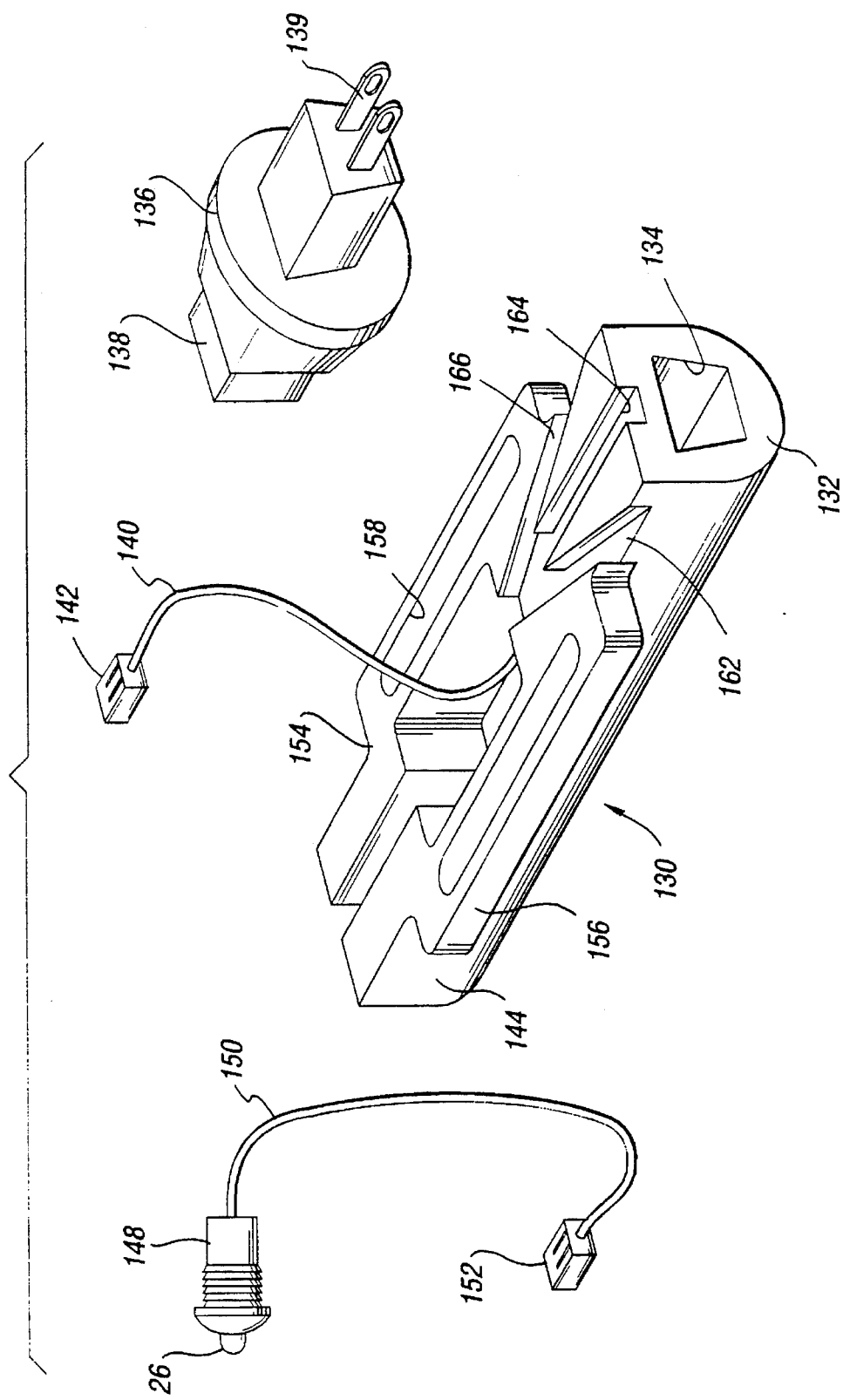

VEHICLE SECURITY SYSTEM RESPONSIVE TO SHORT AND LONG RANGE TRANSMITTERS

TECHNICAL FIELD

This invention relates to remotely controlled vehicle security systems and more particularly to a system that can be selectively placed in one configuration prior to sale of the vehicle to the customer and a second configuration after sale.

BACKGROUND ART

Remotely controlled vehicle security systems are well known in the art. See for example Chen U.S. Pat. No. 5,285,186 assigned to the assignee of the present invention and hereby incorporated herein. Such systems generally include a vehicle mounted radio frequency receiver and a user carried transmitter. The receiver is tuned to receive and decode an encoded signal that identifies the user of the transmitter from which the signal emanate as one authorized to operate the vehicle. The receiver provides the identification (ID) code or signature word to a microprocessor based controller on the vehicle that compares the received code with a one or more valid ID's stored in the controller memory. If a valid code is received the microcontroller toggles between an ARMED and a DISARMED state. In the ARMED state, a starter solenoid interrupt relay is energized to interrupt the solenoid circuit and thereby prevent energization of the solenoid and starting of the engine. In the DISARMED state, the interrupt relay is deenergized to close its contacts in the starter solenoid circuit permitting the starter solenoid to be energized and thereby permit the vehicle to be started. The vehicle door locks may, at the same time, be toggled between a LOCKED and an UNLOCKED state. Some prior art security systems the microcontroller also receives inputs from triggers or sensors which monitor various vehicle conditions indicative of an intrusion or other compromise of vehicle security. If the vehicle security is compromised while the system is in the ARMED state, an alarm such as a siren or vehicle horn is activated. The status of the system is provided by a light emitting diode(LED) or other indicator, usually mounted on the dash to advise the owner of the state of the system and warn potential intruders of the existence of the security system.

Usually, the security system includes a so-called valet switch located within the vehicle in a hidden but accessible location. Operation of the valet switch after turning the ignition switch ON, places the system in a VALET MODE that deactivates or overrides the security system and permits the owner to leave the vehicle with another user, such as a parking attendant, while avoiding potential inadvertent activation of the security system.

Security systems have also been proposed that included a PROGRAM or LEARN MODE of operation, The controller can be placed in this mode only by an authorized user. While in this mode, a transmitter ID code word received from a new or replacement transmitter is stored in the controller memory and become a valid ID for operating the system.

Although security system have been successful in reducing vehicle theft, a large percentage of vehicles delivered by manufacturers to franchised dealers do not include factory installed security systems. Indeed, security systems are not available as a factory installed option on many vehicles. Filling this gap are after-market security systems, the sale of which is to a large extent dependant on the desire of the vehicle salesperson at the dealership to promote the advantages of the security system. While the usual profit incentive exists, it is known that salespeople often disable the installed security system or if no system is installed do not aggressively promote the safety aspects of such systems. One reason, is that installation of a system is best accomplished during normal working hours by the dealer service department. However, vehicles are often sold after the service department is closed, and in any event, inclusion of the security system should not delay delivery of the vehicle to the customer.

It would be advantageous if an after-market security system was installed on all vehicles on the dealer's lot. If the customer did not desire to purchase the system with the vehicle, it can be easily disconnected from the vehicle wiring harness by the salesperson. Moreover, if all vehicles include a system, demonstration of the security system is a necessary adjunct to demonstration of the vehicle by the salesperson. There is also the added advantageous of providing an additional measure of security to the vehicles on the dealer's lot. There are, however, several problems associated with such a proposal. For example, with existing systems the salesperson would need a universal transmitter (one that transmitted a code that was valid for all vehicles on the lot) in order to have access to each vehicle. The alternative would be to locate the valid transmitter for the vehicle to be demonstrated. While a universal transmitter would be convenient for the salesperson, multiple vehicles on the lot within the range of the transmitter would be ARMED or DISARMED as well as the vehicle being demonstrated. The aforementioned alternative is not only inconvenient but would normally make the valet switch available to the salesperson which is not desirable under normal circumstances.

SUMMARY OF THE INVENTION

In accordance with the present invention a security system is proposed which alleviates the aforementioned problems associated with prior art systems. The present system includes a receiver/controller which may be installed on all vehicles on a dealer's lot and "taught" to respond to a low power short range "dealer" transmitter prior to sale and to a conventional relatively high power long range "customer" transmitter after sale. Preferably, the transmitter identification code word size is used by the controller to distinguish the different transmitters. The security system can be demonstrated as a natural adjunct to the sale of the vehicle without affecting other vehicles in the vicinity. The controller cannot be taught to concurrently respond to both a dealer and a customer transmitter and all dealer transmitter ID's are deleted when teaching a customer transmitter ID and vice versa. In addition, only one dealer code can be learned at any one time.

Override of the system is based on both hardware and software control. A removable valet switch is provided that can be operated in combination with the ignition switch to override system operation after sale to the customer. The removable aspect of the switch also provides the owner a further degree of protection against theft. System override by operation of the valet switch is available through the software only after teaching the controller a customer transmitter ID. When configured to respond to a dealer transmitter, a more involved override sequence is available that involves a sequence of operation of the ignition switch. This override sequence is only temporary and discourages system disablement during vehicle sale but does provides an emergency override should the occasion arise.

BRIEF DESCRIPTION OF THE DRAWINGS

A more complete understanding of the present invention may be had from the following detailed description which should be read in conjunction with the drawings in which.

FIG. 9 is a perspective view of a preferred embodiment of a structure for housing a removable valet switch and a security system indicator.

DETAILED DESCRIPTION OF PREFERRED EMBODIMENT

Figure 1:
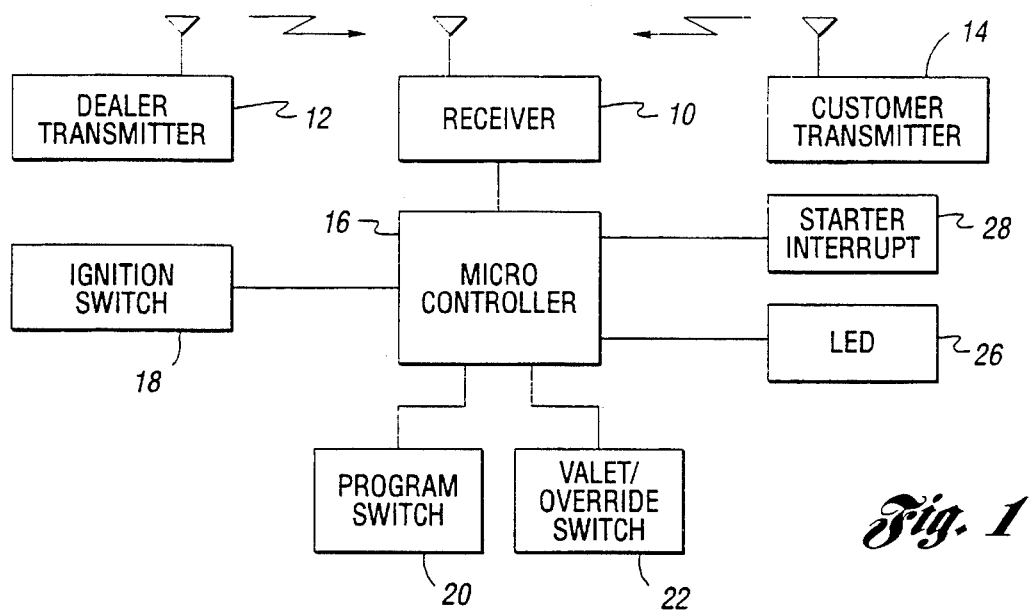
FIG. 1 is a block diagram of security system of the present invention.

Referring now to FIG. 1 the remote controlled security system of the present invention includes a radio frequency receiver 10 mounted on the vehicle for receiving signals of a predetermined frequency from a relatively short range transmitter 12 or a relatively long range transmitter 14 both of which transmit at the predetermined frequency. Preferably, the signal from the short range transmitter cannot be received by the receiver 10 beyond a distance of approximately 4–6 feet, to avoid reception of the signal by receivers mounted on other vehicles located in a dealers lot. On the other hand, the transmitting power of the transmitter 14 is that of a conventional transmitter used in present day security systems and capable of generating a signal which can be received from a substantial distance of 50 feet or more. The transmitters 12 and 14 are substantially the same with the following differences. First, the power output of the transmitter 12 is reduced in any conventional manner such as by resistor sizing in the gain control section of the transmitter. Second, the encoder that establishes the unique identification code word for the transmitter 12 outputs a code word containing a first fixed number of bits (M) while the code word produced by the transmitter 14 contains a second fixed number of bits (N). For example, the coded signal emitted by the transmitter 12 may include a 12 bit ID while that emitted by transmitter 14 may include a 24 bit ID.

The receiver 10 is of conventional design and responds only to receipt of signals of a predetermined frequency such as those generated by transmitters 12 or 14. Upon receipt of such a signal the receiver 10 inputs the 12 bit or 24 bit ID code to a controller 16. The controller 16 is preferably microprocessor based and receives other inputs from an ignition switch 18, a learn switch 20, and a valet switch 22. The controller 16 controls energization of a LED generally indicated at 26 and a starter solenoid interrupt relay indicated at 28. Whenever the controller 16 is in the ARMED MODE, the relay 28 is energized to interrupt the circuit to the starter solenoid and prevent vehicle starting.

Figure 2:
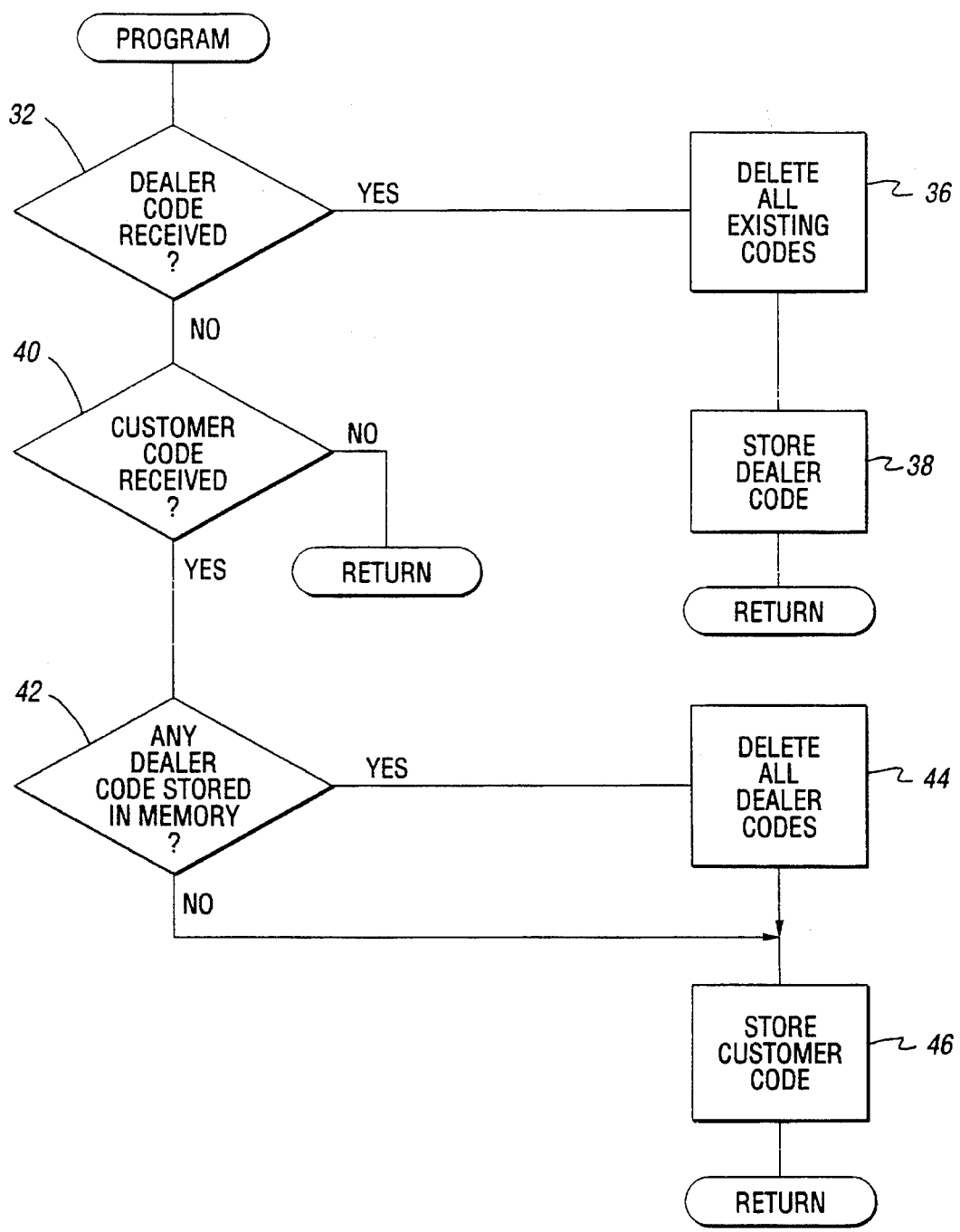
FIG. 2 is a flow diagram of the ARM/DISARM subroutine of the controller program.

As will be described more fully hereinafter, closure of the learn switch 20 initiates a LEARN MODE of operation wherein the ID code from either one of the transmitters 12 or 14 may be entered into the memory of the microcontroller 16. However, the ID codes do not co-exist in memory, i.e. the controller is programmed to respond to receipt of a ID code word from a customer transmitter during the LEARN MODE, to delete all dealer transmitter ID codes that exist in the controller memory. Likewise, receipt of a ID code word from a dealer transmitter during the LEARN MODE causes all customer transmitter ID codes to be deleted from memory. The subroutine in the program of the controller that controls the learning of ID codes, is shown in the flowchart of FIG. 2. The LEARN MODE is entered when the controller recognizes a predetermined sequence of inputs such as opening of the driver's door followed by closure of the ignition switch 18 followed by closure of the learn switch 20. If a transmitter ID code is received while the controller is in the LEARN MODE, a determination of the origin of the code is made in the decision block 32. This determination is based on the number of bits, M for dealer and N for customer, in the ID code word received. If the code is from a dealer transmitter all existing codes ie. all dealer codes and all customer codes are deleted from memory at 36. After clearing the memory of any existing codes the received dealer code is stored in memory as indicated at 38. If on the other hand the signal received is not a dealer code but is rather a customer code as determined by the decision block 40, a decision is made at 42 regarding whether any dealer codes are stored in memory. If any dealer codes exist in memory they are deleted at 44 and the received customer code is stored as indicated at 46. After storage of the received code, or if the code received is neither a dealer nor a customer code, the program returns to the main loop. Though not shown in FIG. 2, a software counter may be started upon entry of the PROGRAM MODE to cause the program to return to the main loop if no signal is received within a predetermined time interval of for example 15 seconds. Accordingly, the system permits an authorized vehicle user to program the controller to respond to either one of two types of transmitters such as the short range dealer transmitter, while deleting any previously stored ID codes generated by the long range customer transmitter and vice versa. Further, only one dealer code can be stored in memory at any time. It is contemplated that each dealer will have a unique code assigned to the dealership and all dealer transmitters will be coded with this unique code. It is therefore desirable that the controller be inhibited from learning more than one dealer code at a time. On the other hand it is desirable that the controller be programmed to permit more than one customer code to be stored to accommodate several authorized users of the vehicle. For example the block 46 envisions a first-in-first-out memory arrangement that permits four customer codes to be stored at any one time.

Figure 3:
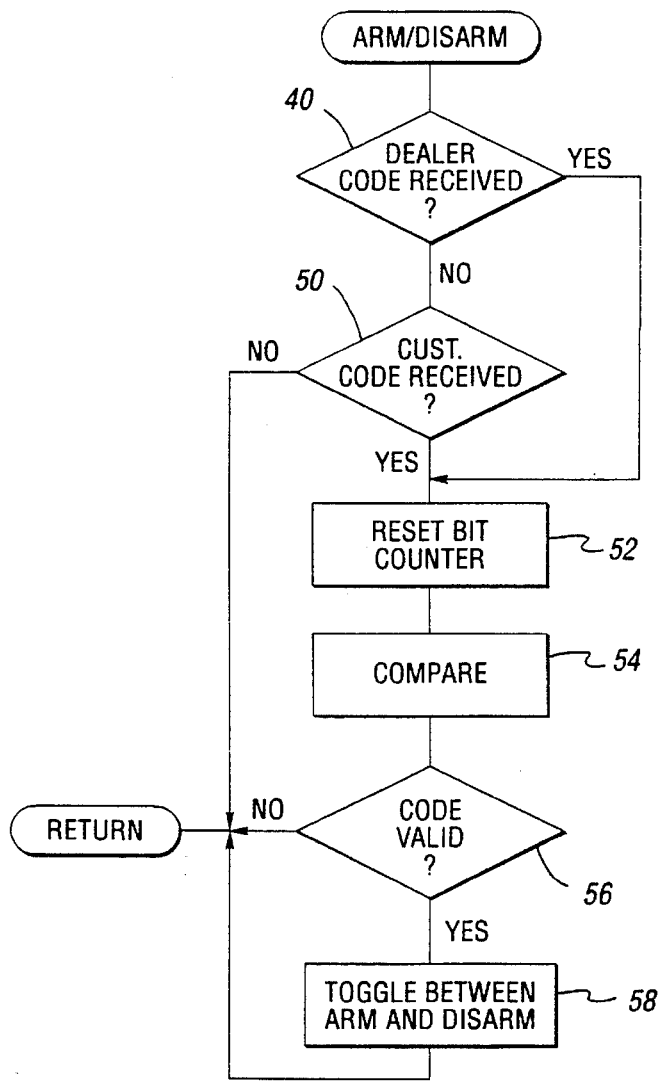
FIG. 3 is a flow diagram of the PROGRAM subroutine.

Once a valid ID code is stored in the memory of controller 16 and the system is no longer in the PROGRAM MODE, receipt of an ID code of the proper frequency causes a subroutine to be called to control arming of the system. With reference to FIG. 3 this subroutine includes decision blocks 48 and 50 wherein a determination is made whether the received ID code was emitted by a dealer transmitter or a customer transmitter. This decision is made by counting the number of bits in the ID code using either a hardware or software bit counter. In either case, after detection, the bit counter is reset as indicated at 52. The received code is compared at 54 with the codes in memory. If the received code is a valid code i.e. corresponds to one of the codes in memory, as determined in decision block 56, then the system is toggled to the ARM MODE, if in the DISARM MODE, or vice versa as indicated at 58. If the code received is neither a dealer code nor a customer code or if the received code is not a valid code, the program returns to the main loop.

Figure 4:
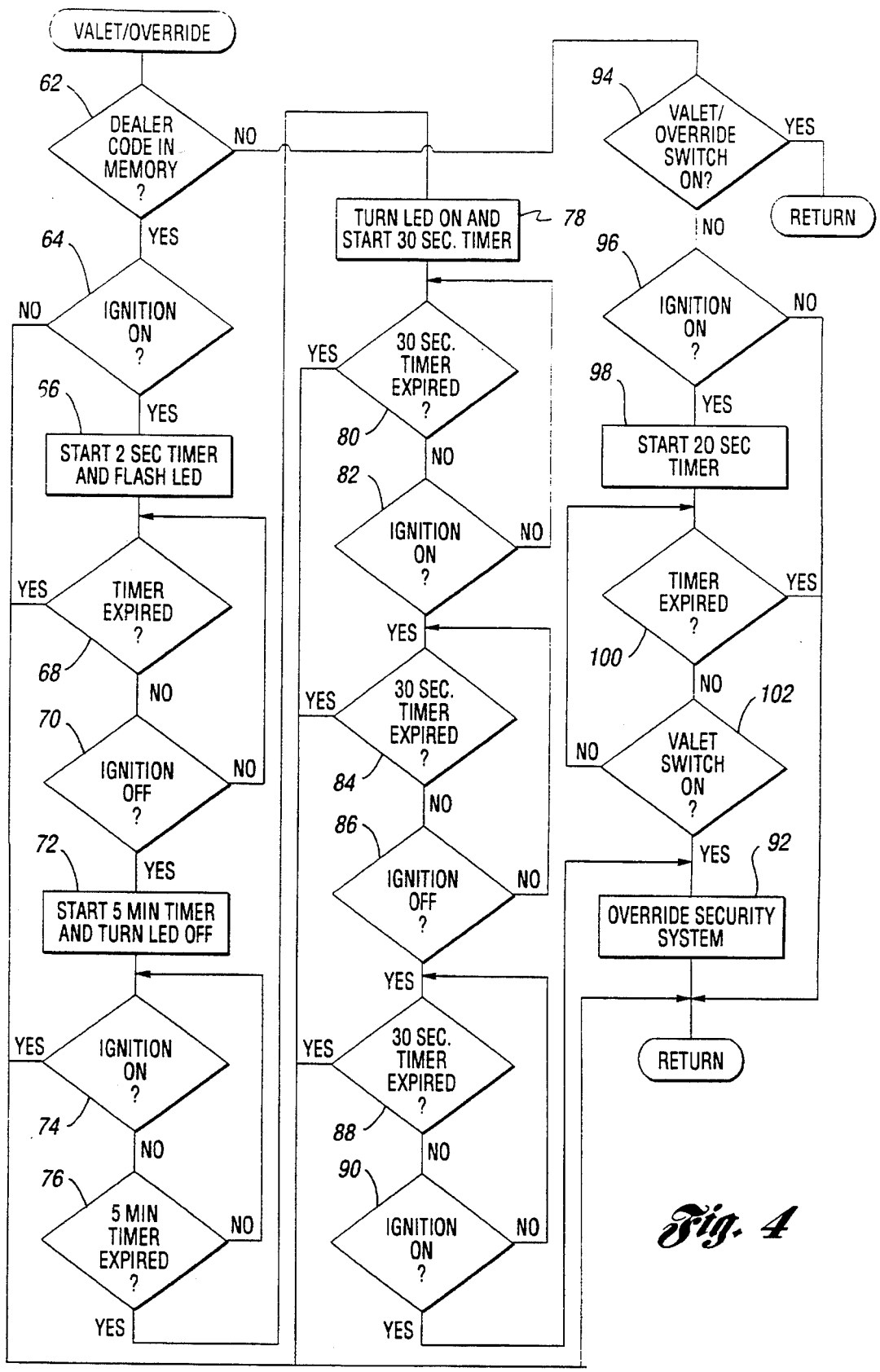
FIG. 4 is a flow diagram of the VALET/OVERRIDE subroutine.

Sequential closure of the ignition switch and the Valet/Override switch 22 initiate a subroutine in the controller 16 which overrides the security system. Prior to delivery of the vehicle to the customer, override of the system is accomplished through a procedure involving actuation of the ignition switch between the on and off positions in a timed sequence which is prompted by the security indicator. This sequence of ignition switch operations is intended to prevent the casual overriding of the security system while providing a system override during a true emergency such as a lost or inoperative transmitter during demonstration of the vehicle. Referring to FIG. 4 the subroutine for overriding the security system includes a decision block 62 which determines which override procedure is in force. This subroutine may be called on a regular basis or upon predetermined system operating conditions. When the subroutine is called, and a dealer code is stored in memory as determined by the decision block 62, the controller 16 determines at decision block 64 whether the ignition switch is in the ON position. If the ignition switch is not ON, the subroutine returns to the main loop. If the ignition switch is ON, a 2 second timer is started and the LED 26 is flashed at a fixed rate as indicated at block 66. If the ignition switch is turned OFF before the expiration of the 2 second time interval a 5 minute timer is started. When the 5 minute timer is started, the flashing LED is extinguished. This action is depicted in the blocks 68, 70 and 72. If the ignition switch is maintained in the OFF position for the 5 minute interval as determined by the decision blocks 74 and 76, a 30 second timer is started and the LED is energized continuously as indicated at 78. If the ignition switch is turned ON before the LED is turned on at block 78, the program returns to the main loop. As indicated in blocks 80–90, the ignition switch must be turned ON then OFF and back ON again during the 30 second time interval in order to override the system at 92.

After sale of the vehicle and storage of one or more customer codes in the controller memory, override of the system is accomplished by closing the valet switch 22 within a 20 second time interval following actuation of the ignition switch to the ON position. The after sale condition, i.e. customer codes are stored in memory, is detected by the decision block 62. If the valet switch is actuated to the ON position, before the ignition switch is closed, the program returns to the main loop as indicated in block 94. When the ignition switch is turned ON as detected by block 96, a 20 second timer is started as indicated at 98. If the valet switch 22 is activated before the timer expires as determined by the blocks 100 and 102, the security system is overridden. Otherwise, the program returns to the main loop.

Figure 5:
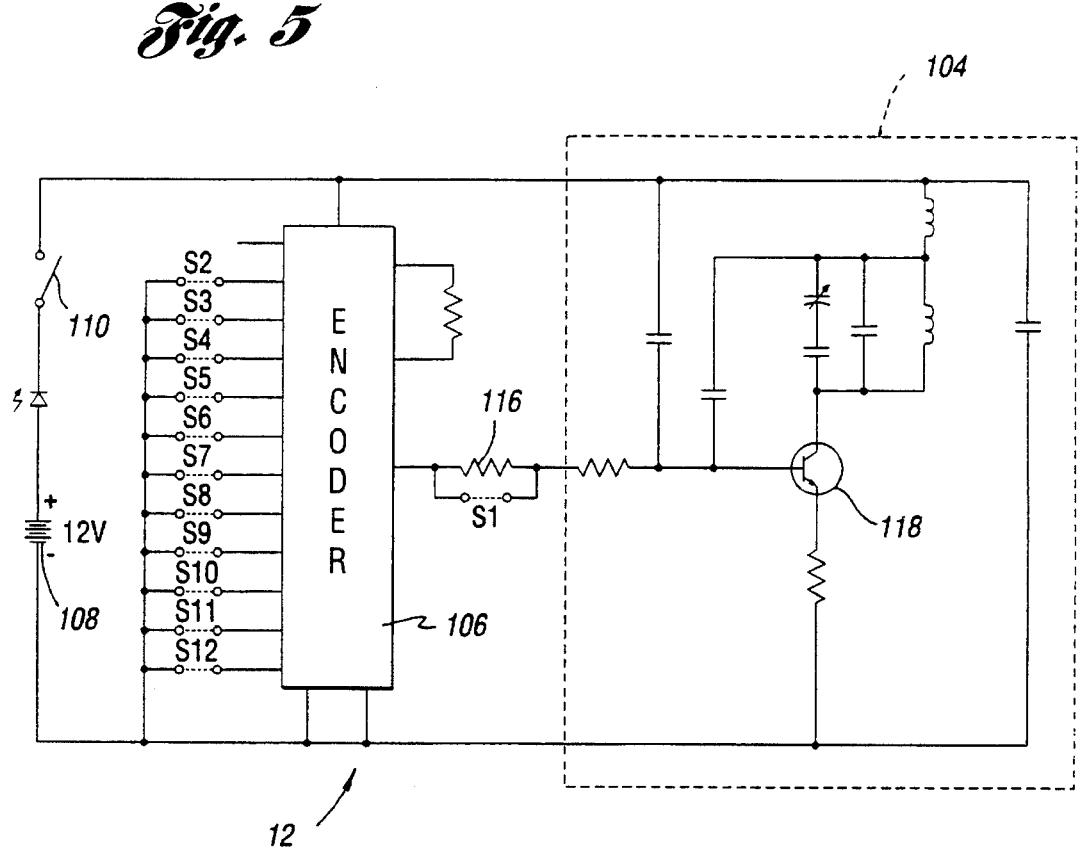
FIG. 5 is a circuit diagram of a dealer transmitter.
Figure 6A:
FIGS. 6a–6c show the format of the dealer transmitter code.
Figure 6B:
Figure 6C:
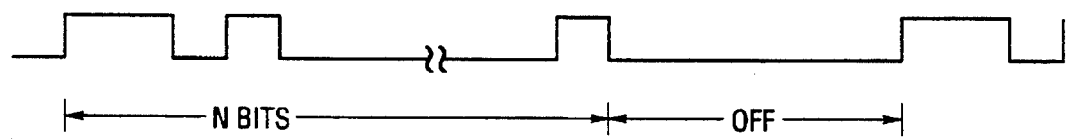

Referring now to FIG. 5 the low power dealer transmitter 12 is a single button transmitter of conventional design which has been modified to reduce output power. The transmitter 12 includes an RF oscillator generally designated 104 and an encoder 106. Power is supplied by a battery 108 through an operator control switch 110. An indicator in the form of LED is provided for indicating when power is applied. The transmitter ID code word for the dealer transmitter is set by the state of the switches S2–S12 and is transmitted whenever the switch 110 is closed. The switch S1 is connected across a resistor 116 in the base circuit of transistor 118. The switch S1 is normally set to the open position so that the output power is substantially reduced by the inclusion of the resistor 116 in the base circuit. Under certain circumstances, such as high RF noise conditions, it may be necessary to utilize the full power of the dealer transmitter. In that case the switch S1 may be closed to shunt the resistor 116 so that the transmitter can radiate full power. Closure of the switch 110 controls the ARM/DISARM function of the security system. The code format for the dealer transmitter 14 is shown in FIGS. 6a–6c. A pulse width modulated code is employed where a binary "1" bit is represented by a high voltage level for ⅔T and a low voltage level for ⅓T where T is the bit time interval of for example 1 microsecond. A word consists of N bits transmitted over a 12 microsecond period followed by a 12 microsecond quiet period. The power of the dealer transmitter is relatively low so that the receiver does not respond to a dealer transmitter unless the transmitter is in close proximity to the vehicle. Thus, in a dealers lot, where a large number of vehicles are configured to respond to a dealer code, only the vehicle to be demonstrated to the potential customer will be affected by operation of the dealer transmitter.

Figure 7:
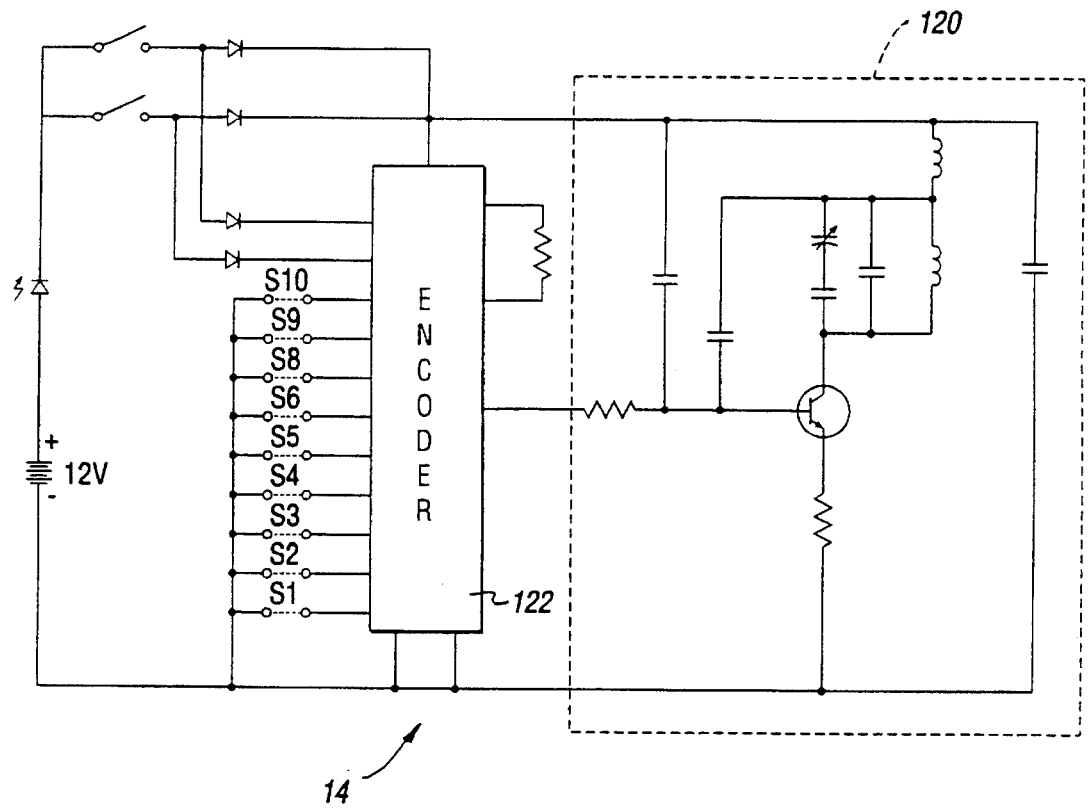
FIG. 7 is a circuit diagram of a customer transmitter.
Figure 8A:
FIGS. 8a–8c show the format of the customer transmitter code.
Figure 8B:
Figure 8C:
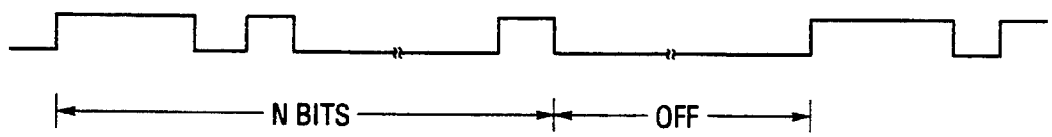

Referring now to FIG. 7 the customer transmitter 14 is of conventional design and includes an RF oscillator generally designated 120 and an encoder 122. Power is supplied by a battery 124 through a pair of operator control switches S11 and S12 that also supply inputs to the encoder 122. An indicator in the form of an LED is provided for indicating when power is applied by closure of either of the switches S11 or S12. The transmitter ID code word for the customer transmitter is set by the state of the switches S1–S10. It will be understood that the code may be established by other well known means such as by selectively cutting electrical tracings etched on a printed circuit board or by programming an EEPROM. Closure of the switch S11 controls the ARM/DISARM function while closure of the switch S12 may control an axillary function such as operating the vehicle trunk. The code format for the customer transmitter 14 is shown in FIGS. 8a–8c. A pulse width modulated code is employed where a binary "1" bit is represented by a high voltage level for ¾T and a low voltage level for ¼T where T is the bit time interval of for example 1 microsecond. A word consist of N bits transmitted over a 24 microsecond period followed by an 8 microsecond quiet period. During the 24 microsecond interval the customer ID is transmitted twice to form a 24 bit word. As previously indicated the controller 16 counts the incoming bits from the receiver 10 to determine whether the identification code words are being received from the transmitter 12 or 14.

Referring now to FIG. 9, a housing 130 for supporting both a removable valet switch and the LED 26 is shown. Mounting the LED and valet switch in a single housing provides convenience of installation and ease of use. One end 132 of the housing includes a generally rectangular shaped opening 134 for receiving a valet switch holder 136. The valet switch structure is not shown but is of conventional design and suitably operated by a push button 138. Preferably the button is pushed in to place the switch in a latched position and subsequently pushed in to release the switch from the latched position. Male terminals 139 extend from the holder 136 for insertion into mating receptacles (not shown) in the end 132 to establish an electrical path through wiring 140 and connector 142. The connector 142 is intended to be inserted in a suitable input port of the controller 16. The housing 130 includes an end 144 containing an opening 146 for receiving an LED holder 148 that houses the LED 26. The LED 26 is electrically connected to an output port of the controller 16 through wiring 150 and connector 152. The housing 130 includes integrally formed mounting extensions 154 and 156 containing slots 158 and 160 that are adapted to receive suitable fasteners for mounting the housing 130 to the underside of the vehicle dash. The housing 130 is provided with suitable recesses 162, 164 and 168 for accommodating the wiring 140 and 150 to permit the housing to be mounted flush with the dash.

While the best mode for carrying out the invention has been described in detail, those familiar with the art to which this invention relates will recognize various alternative designs and embodiments for practicing the invention as defined by the following claims.

In the claims:

1. A vehicle security system comprising a vehicle mounted receiver, said system further including a controller for arming and disarming the system in response to receipt by said receiver of a valid code from a remote transmitter, said controller operable in a learn mode to store in memory a code received by said receiver from a first transmitter and to remove from memory any previously stored code representing a second transmitter, said controller responsive to operator actuable input switch means, said controller programmed to respond to different sequences of operation of said switch means for overriding a security system function depending upon whether said controller has been taught to respond to codes from said first or said second transmitters.

2. The system of claim 1 including a removable switch for performing the override function, said controller being programmed to inhibit said switch from performing said override function when said controller has been taught to respond to a code from said first transmitter.

3. The system of claim 1 wherein said controller is programmed to respond to a predetermined sequence of operation of the vehicle ignition switch to override the security system function when said controller has been taught to respond to a code from said second transmitter.

4. The system of claim 1 wherein said first transmitter includes means for establishing the transmitter output power, the output power of said first transmitter being low relative to the output power of said second transmitter, the code transmitted by said relatively short and long range transmitters each having a unique identification number and having a further characteristic which is detectable by said controller in order to determine whether the received code is from a relatively short range transmitter or a relatively long range transmitter.

5. The system of claim 1 wherein said first and second transmitters each includes means for establishing the length of an identification code word, the identification code word transmitted by said first transmitter being of a different length compared with the identification code word transmitted by said second transmitter.

6. The system of claim 5 wherein said first transmitter includes means for establishing the transmitter output power, the output power of said first transmitter being low relative to the output power of said second transmitter.

7. A vehicle security system comprising a vehicle mounted receiver, said system further including a controller for arming and disarming the system in response to receipt by said receiver of a valid code from a remote transmitter, said controller being programmed to respond to operation of a switch for overriding a security system function, a switch holder containing said switch and including a manually operable actuator for controlling said switch, said switch holder supporting terminal means electrically connected with said switch, a switch holder support housing mounted in the vehicle passenger compartment for removably receiving and supporting said switch holder and establishing electrical contact with said switch, conductor means supported within said housing for electrically connecting said switch with said controller.

8. The system of claim 7 wherein said housing further includes means for supporting a removable security system indicator.

9. A vehicle security system comprising a vehicle mounted receiver, said system further including a controller for arming and disarming the system in response to receipt by said receiver of a valid code transmitted from a relatively short range transmitter or from a relatively long range transmitter, the code transmitted by said relatively short and long range transmitters having a unique identification number and having a further characteristic which is detectable by said controller in order to determine the origin of the transmitted code, said controller operable in a learn mode to store in memory a code received by said receiver from said long range transmitter and remove from memory any previously stored code from said short range transmitter and further while in said learn mode to delete all previously stored long range and short range codes in response to receipt by said receiver of a code from said short range transmitter and store the received code from said short range transmitter.

10. The system of claim 9 wherein said controller means is responsive to operator actuable input switch means and is programmed to respond to different sequences of operation of said switch means for overriding a security system function depending upon whether said controller has been taught to respond to a code from said short range or said long range transmitters.

11. The system of claim 10 wherein said switch means includes an override switch for performing the override function when said controller has been taught to respond to a code from said long range transmitter, said controller being programmed to inhibit said override switch from performing said override function when said controller has been taught to respond to a code from said short range transmitter.

12. The system of claim 11 wherein said controller is programmed to respond to a predetermined sequence of operation of the vehicle ignition switch to override the security system function when said controller has been taught to respond to a code from said short range transmitter.

13. The system of claim 12 wherein said override switch is removable by the user of the vehicle.

14. The system of claim 9 wherein said characteristic is the word length of the code.

15. A vehicle security system comprising a vehicle mounted receiver, said system further including a controller for arming and disarming the system in response to receipt by said receiver of a valid code transmitted from a relatively short range transmitter or from a relatively long range transmitter, the code transmitted by each of said relatively short and long range transmitters having a characteristic which is detectable by said controller in order to determine whether the code originated from said short or said long range transmitter, said controller including a memory for storing either a code from a short range transmitter or a code from a long range transmitter, said controller being programmed to prevent simultaneous storage of both a short and a long range transmitter code and further programmed to respond to a plurality of input devices which provide an input related to a function of the security system when the code of a long range transmitter is stored in memory, said controller further programmed to inhibit at least one of said functions when the code of a short range transmitter is stored in memory.

16. The system defined in claim 15 wherein, the code transmitted contains both a unique identification code number and a further identifier which permits said controller to determine whether a received code is from a short or a long range transmitter, said controller operable in a learn mode to respond to receipt of a code from a relatively short range transmitter to delete all previously stored codes in memory and store in memory the code received from said short range transmitter, said controller further operable in said learn mode to respond to receipt of a code from a relatively long range transmitter, to delete any previously stored short range transmitter code if such exist and to store in memory the code received by said receiver from said relatively long range transmitter.

17. The system of claim 16 wherein said input device is a system override switch.

18. The system of claim 17 wherein said override switch is contained within a switch holder, a manually operable actuator for controlling said switch, said switch holder supporting terminal means electrically connected with said switch, a switch holder support housing mounted in the vehicle passenger compartment for removably receiving and supporting said switch holder and establishing electrical contact with said switch, conductor means supported within said housing for electrically connecting said switch with said controller.

19. The system of claim 18 wherein said further identifier is the word length of said identification code.

* * * * *